United States Patent
Valero et al.

(10) Patent No.: US 8,009,509 B2
(45) Date of Patent: Aug. 30, 2011

(54) AUTOMATED MUD SLOWNESS ESTIMATION

(75) Inventors: Henri-Pierre Valero, Belmont, MA (US); Hugues A. Djikpesse, Cambridge, MA (US); Bikash K. Sinha, Cambridge, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 387 days.

(21) Appl. No.: 12/100,211

(22) Filed: Apr. 9, 2008

(65) Prior Publication Data

US 2009/0257307 A1 Oct. 15, 2009

(51) Int. Cl.
 *G01V 1/28* (2006.01)
 *G01V 1/50* (2006.01)
(52) U.S. Cl. ............................................ 367/31; 367/32
(58) Field of Classification Search .................... 367/25, 367/31, 32
See application file for complete search history.

(56) References Cited

U.S. PATENT DOCUMENTS

| | | | |
|---|---|---|---|
| 5,687,138 A | 11/1997 | Kimball et al. | |
| 5,841,280 A | 11/1998 | Yu et al. | |
| 6,526,354 B2 | 2/2003 | Bose et al. | |
| 6,654,688 B1 | 11/2003 | Brie et al. | |
| 2004/0006428 A1 | 1/2004 | Hsu et al. | |
| 2006/0016592 A1* | 1/2006 | Wu | 166/250.07 |
| 2006/0233047 A1 | 10/2006 | Zeroug et al. | |
| 2006/0285437 A1* | 12/2006 | Sinha et al. | 367/37 |

OTHER PUBLICATIONS

Patent Cooperation Treaty, International Search Report, Nov. 24, 2009, 3 pages.
Cheng, et al., "Elastic wave propagation in a fluid filled borehole and synthetic acoustic logs," Geophysics, 46, 1981, p. 1042.
Djikpesse et al., "Multiparameter l1 norm waveform fitting: Interpretation of Gulf of Mexico reflection seismograms" Geophysics, 64, 1999, pp. 1023-1035.
Djikpesse et al., "Borehole-guided AVO analysis of P-P and P-S reflections: Quantifying uncertainties of density estimate", Geophysical Prospecting, 54, 2006, pp. 515-523.
Hornby, Be, "Imaging of near-borehole structure using full-waveform sonic data", Geophysics, 54, (6), pp. 747-757, 1989.
Kimball et al., "Semblance processing of borehole acoustic data", Geophysics, 49, 1987, pp. 530-544.
Lang, et al., "Estimating slowness dispersion array from arrays of sonic waveforms", Geophysics, 52 (4), 1987, pp. 530-544.
Paillet et al., "Acoustic waves in borehole", CRC Press Inc., ISBN 0-8493-8890-2, Boca Raton, Ann Arbor, Boston, London, 1991, pp. 37-59.
Plona et al., "Identifying formation response using sonic dispersion curves", 74th Annual International Meeting of the Society of Exploration Geophysicists (SEG), 2004, Denver, Expanded Abstracts.
Rade et al., "Mathematics handbook for science and engineering", 5th ed., Springer, 2004, pp. 444-445.

(Continued)

*Primary Examiner* — Ian J Lobo
(74) *Attorney, Agent, or Firm* — Rachel Greene; Helene Raybaud; Brigid Laffey (57) ABSTRACT

An integrated framework is described for automating some or all of mud slowness estimation for both fast and slow formations. An estimation of fluid slowness based on monopole radial profiling is calculated if conditions permit. Alternatively, an estimation of fluid slowness based on Scholte wave slowness is estimated if conditions do not permit calculation based on monopole radial profiling. Tool standoff may also be estimated based on monopole radial profiling.

20 Claims, 7 Drawing Sheets

OTHER PUBLICATIONS

Sinha, et al., "Geophysical prospecting using sonics and ultrasonics", Wiley Encyclopedia of Electrical and Electronic Engineers, John G. Webster, Editor, John Wiley and Sons, Inc. 1997.

Norris et al., "The speed of a wave along a fluid-solid interface in the presence of anisotropy and prestress", J. Acoust. Soc. Am., 1995, 98(2), pp. 1147-1154.

Sinha, et al., "Radial variations in cross-dipole shear slownesses in a limestone reservoir", 70th Annual International Meeting of the Society of Exploration Geophysicists (SEG), Calgary, 2000, Expanded Abstracts.

Sinha et al, "Radial profilling of formation shear velocity from borehole flexural dispersions", IEEE International Ultrasonics Symposium Proceedings, Atlanta, Oct. 2001, (IEEE Cat No. 01CH37263), vol. 1, pp. 391-396.

Sinha et al., "Radial profiling of the three formation shear moduli and its application to well completions", Geophysics, 71(6), 2006, E65-E77.

Tarantola, A. "Inverse problem theory and methods for model parameter estimation", SIAM, 2004, p. 324.

Tichelaar, et al., "Sonic logging of compressional-wave velocities in a very slow formation", Geophysics, 60, 1995, pp. 1627-1633.

Valero et al., "Multiple-shot processing in slowness and time domain of array sonic waveforms", 70th Annual International Meeting of the Society of Exploration Geophysicists (SEG), Calgary, 2000, Expanded Abstracts.

Valero et al., "High resolution compressional slowness log estimation using first motion detection", 2005, 75th Annual International Meeting of the Society of Exploration Geophysicists (SEG), Houston, 2005, Expanded Abstracts.

Valero et al., "Processing of monopole compressional in slow formation", 74th Annual International Meeting of the Society of Exploration Geophysicists (SEG), Denver, 2004, Expanded Abstracts.

* cited by examiner

AUTOMATED MUD SLOWNESS ESTIMATION

BACKGROUND OF THE INVENTION

1. Field of the Invention

This invention is generally related to acoustic data analysis, and more particularly to automated estimation of fluid slowness to facilitate acoustic logging and analysis 2. Background of the Invention Formations are characterized in terms of slowness values. For example, a formation may be characterized as being slow if the shear slowness, i.e., inverse of velocity, of the formation is greater than the mud slowness. If the shear slowness of the formation is less than the mud slowness then the formation may be characterized as being fast. As described in Cheng, C. H., and Toksoz, M. N., 1981, Elastic wave propagation in a fluid filled borehole and synthetic acoustic logs, *Geophysics*, 46, p. 1042, in fast formations it is known to utilize a monopole source, where refracted compressional arrival time, refracted shear arrival time, and a Stoneley wave which is guided by the fluid-rock interface are excited by the monopole source. These various arrivals are usually used to estimate, respectively, compressional, shear and Stoneley slowness of the formation. As described in Paillet, F. L. and Chang, C. H., 1991, Acoustic waves in borehole: CRC Press Inc, ISBN 0-8493-8890-2, Boca Raton, Ann Arbor, Boston, London, it is also possible to use other modes such as leaky modes to get an estimate of compressional slowness in a slow formation. However, in slow formations it is not possible to measure formation shear slowness from headwaves because shear waves do not exist in slow formations. It is known to use a dipole transmitter that excites dipole flexural waves in the borehole in order to overcome this limitation. Like other borehole modes, the dipole mode is dispersive (See Sinha, B. K. and Zeroug, S., 1997, Geophysical prospecting using sonics and ultrasonics: Wiley Encyclopedia of Electrical and Electronic Engineers, John G. Webster, Editor, John Wiley and Sons, Inc.). However, it is possible to estimate formation shear slowness by extracting the dipole slowness at low frequencies as described by Kimball, C. V, and Marzetta, T. L., 1987, Semblance processing of borehole acousticg data, *Geophysics*, 49, 530-544.

One factor that affects acoustic wave propagation measurements in a fluid filled borehole is the fluid slowness, e.g., mud slowness, where mud is disposed between the tool and the borehole wall. There is no practical technique for measurement of the mud slowness in a well at sonic frequencies. Various indirect and direct evaluation techniques are known. However, these techniques have some drawbacks.

Indirect evaluation of mud slowness can be based on examination of mud samples at the surface or data from the manufacturer of the mud components. However, these techniques tend to be inaccurate because mud slowness is a function of conditions which can differ significantly between the surface and locations of interest within the well, e.g., pressure, temperature, presence/absence of gas, etc. Empirical equations have been developed that describe some common mud types, but errors can still occur if incorrect assumptions about conditions are used, or if the uncertainties of some parameters are too large.

Direct evaluation of mud slowness can be based on the dispersive characteristics of some modes using a Prony-based method as described by Lang, S. W., Kurkjian, A. L., McClellan, J. H., Morris, C. F., and Parks, T. W., 1987, Estimating slowness dispersion array from arrays of sonic waveforms: *Geophysics*, 52 (4), 530-544. The technique involves transforming an array of time waveforms into a frequency slowness domain to enable evaluation of the characteristics of the various dispersive and non-dispersive modes present in the recorded data, as described by Plona, T., Sinha, S., Kane, M., Bose, S., Wang, C., Pabon, J., Zeroug, S., 2004, Identifying formation response using sonic dispersion curves, 74th Annual International Meeting of the Society of Exploration Geophysicists (SEG), Denver, Expanded Abstracts. Various options are available for performing this analysis, depending on the formation type and modes considered. One option includes adjusting the mud slowness in the modeling parameters to match the Stoneley dispersion curve model to the dispersion curve computed from the data. Another option is based on the fact that mud slowness is asymptotically approached by both the Stoneley and flexural data. The asymptote of the Stoneley dispersion curve at high frequency must be slower or equal to the mud value, while the value of the shear asymptotes must be faster than the mud (unless the formation is damaged). The dipole-flexural curve converges to the Scholte slowness, which is dependent on both mud slowness and the formation properties close to the borehole wall. Another option is based on the Leaky P mode. However, this option is only valid when a leaky compressional is present in the data, i.e., in a slow formation. The leaky modes can be considered as multiple reflected and constructively interfering waves propagating in the borehole, as described by Tichelaar, B. W. and Luik K. W., 1995, Sonic logging of compressional-wave velocities in a very slow formation, *Geophysics*, 60, 1627-1633; and Valero, H. P., Peng, L., Yamamoto, M., Plona, T., Murray, D., Yamamoto, H., 2004, Processing of monopole compressional in slow formation, 74th Annual International Meeting of the Society of Exploration Geophysicists (SEG), Denver, Expanded Abstracts. Unlike the refracted P head wave, leaky modes are dispersive, i.e., starting at the compressional velocity at low frequency and tending to the mud velocity as frequency increases. Further, there exists a cutoff frequency below which they are not excited. Although such dispersion analysis may be used to estimate mud slowness, the technique requires time-consuming analysis of various frames by skilled personnel. Further, none of the techniques is suitable for all formations.

SUMMARY OF THE INVENTION

In accordance with an embodiment of the invention, a method of estimating an indication of fluid slowness comprises calculating an indication of fluid slowness based on monopole radial profiling if conditions permit; and calculating an indication of fluid slowness based on Scholte wave slowness if conditions do not permit calculation based on monopole radial profiling.

In accordance with another embodiment of the invention, apparatus for estimating an indication of fluid slowness comprises at least one acoustic sensor for obtaining monopole radial profiling data and Scholte wave slowness data; processing circuitry for calculating an indication of fluid slowness based on monopole radial profiling if conditions permit; and processing circuitry for calculating an indication of fluid slowness based on Scholte wave slowness if conditions do not permit calculation based on monopole radial profiling. It should also be noted that the mud slowness estimated from the Scholte wave slowness can be used as a priori information for a probability distribution function (PDF) of the fluid while calculating based on the monopole radial profiling technique.

An advantage of the invention is that it helps provide an integrated framework capable of automating some or all of mud slowness estimation for both fast and slow formations. A first analysis, suitable for fast formations, is based on a probabilistic approach using high frequency monopole data. In particular, the results of the monopole radial image are used to obtain an estimation of the mud slowness. The second analysis, suitable for slow formations, is based on the use of the Scholte wave slowness. The second analysis depends on mud and formation material properties, but is independent of borehole radius. Both techniques are combined in one unified and automated framework to facilitate automated operation in both fast and slow formations.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
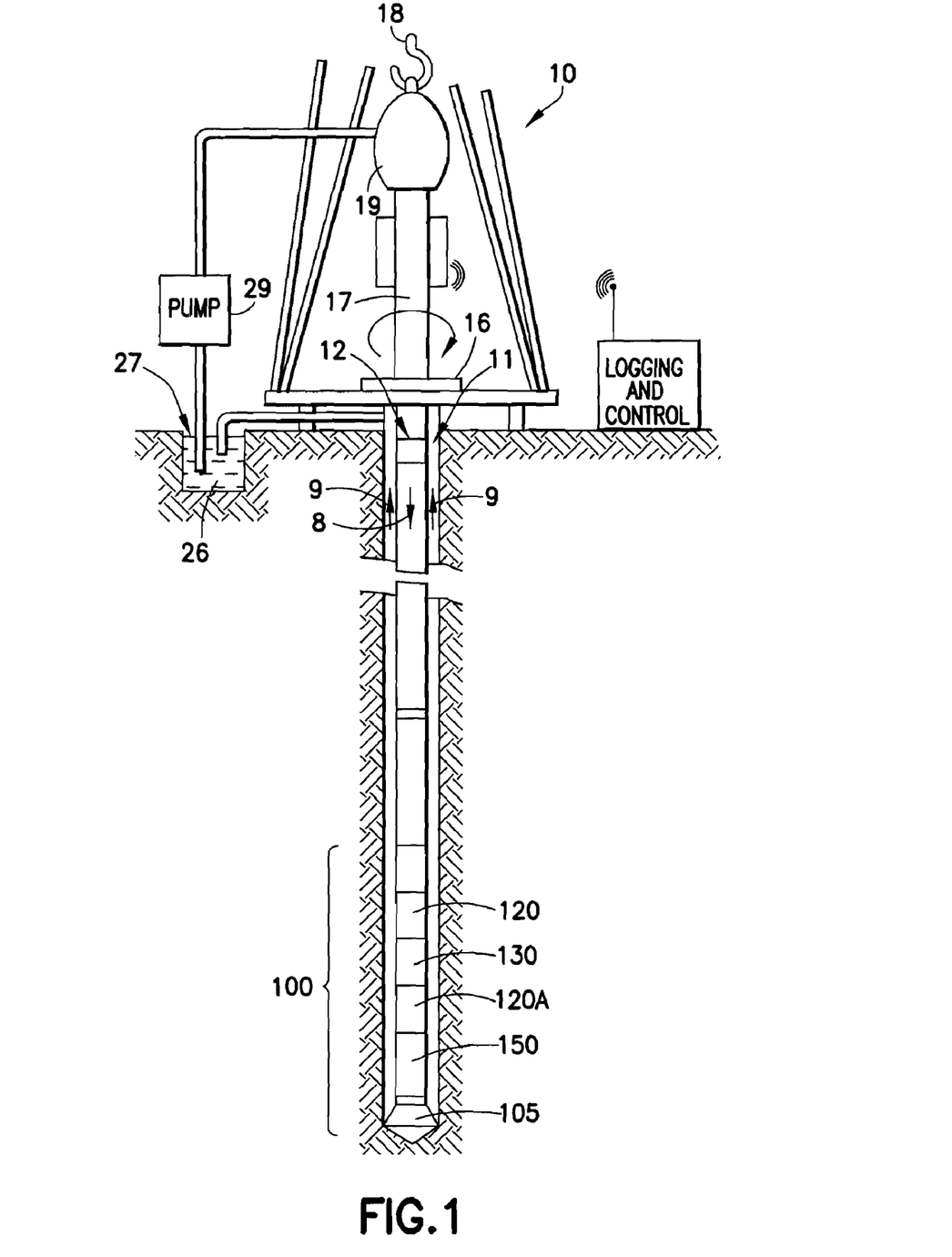
FIG. 1 illustrates a wellsite system in which the present invention can be employed, and a LWD embodiment, according to embodiments of the invention.

FIG. 1 illustrates a wellsite system in which the present invention can be employed. The wellsite can be onshore or offshore. In this exemplary system, a borehole (11) is formed in subsurface formations by rotary drilling in a manner that is well known. A drill string (12) is suspended within the borehole (11) and has a bottom hole assembly (100) which includes a drill bit (105) at its lower end. The surface system includes platform and derrick assembly (10) positioned over the borehole (11), the assembly (10) including a rotary table (16), kelly (17), hook (18) and rotary swivel (19). The drill string (12) is rotated by the rotary table (16), energized by means not shown, which engages the kelly (17) at the upper end of the drill string. The drill string (12) is suspended from a hook (18), attached to a traveling block (also not shown), through the kelly (17) and a rotary swivel (19) which permits rotation of the drill string relative to the hook. As is well known, a top drive system could alternatively be used.

The surface system may include drilling fluid or mud (26) stored in a pit (27) formed at the well site. A pump (29) delivers the drilling fluid (26) to the interior of the drill string (12) via a port in the swivel (19), causing the drilling fluid to flow downwardly through the drill string (12) as indicated by the directional arrow (8). The drilling fluid exits the drill string (12) via ports in the drill bit (105), and then circulates upwardly through the annulus region between the outside of the drill string and the wall of the borehole, as indicated by the directional arrows (9). In this well known manner, the drilling fluid lubricates the drill bit (105) and carries formation cuttings up to the surface as it is returned to the pit (27) for recirculation.

Acoustic data is gathered with a logging tool which may be of any type, including but not limited to wireline type (See FIG. 2) and logging while drilling type (See FIG. 1). The bottom hole assembly (100) of the embodiment illustrated in FIG. 1 includes a logging-while-drilling (LWD) module (120), a measuring-while-drilling (MWD) module (130), a roto-steerable system and motor, and drill bit (105). The LWD module (120) is housed in a special type of drill collar, as is known in the art, and can contain one or a plurality of known types of logging tools. It will also be understood that more than one LWD and MWD module can be employed, e.g. as represented at (120A). (References, throughout, to a module at the position of (120) can alternatively mean a module at the position of (120A) as well.) The LWD module includes capabilities for measuring, processing, and storing information, as well as for communicating with the surface equipment. In the present embodiment, the LWD module includes a pressure measuring device. The MWD module (130) is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
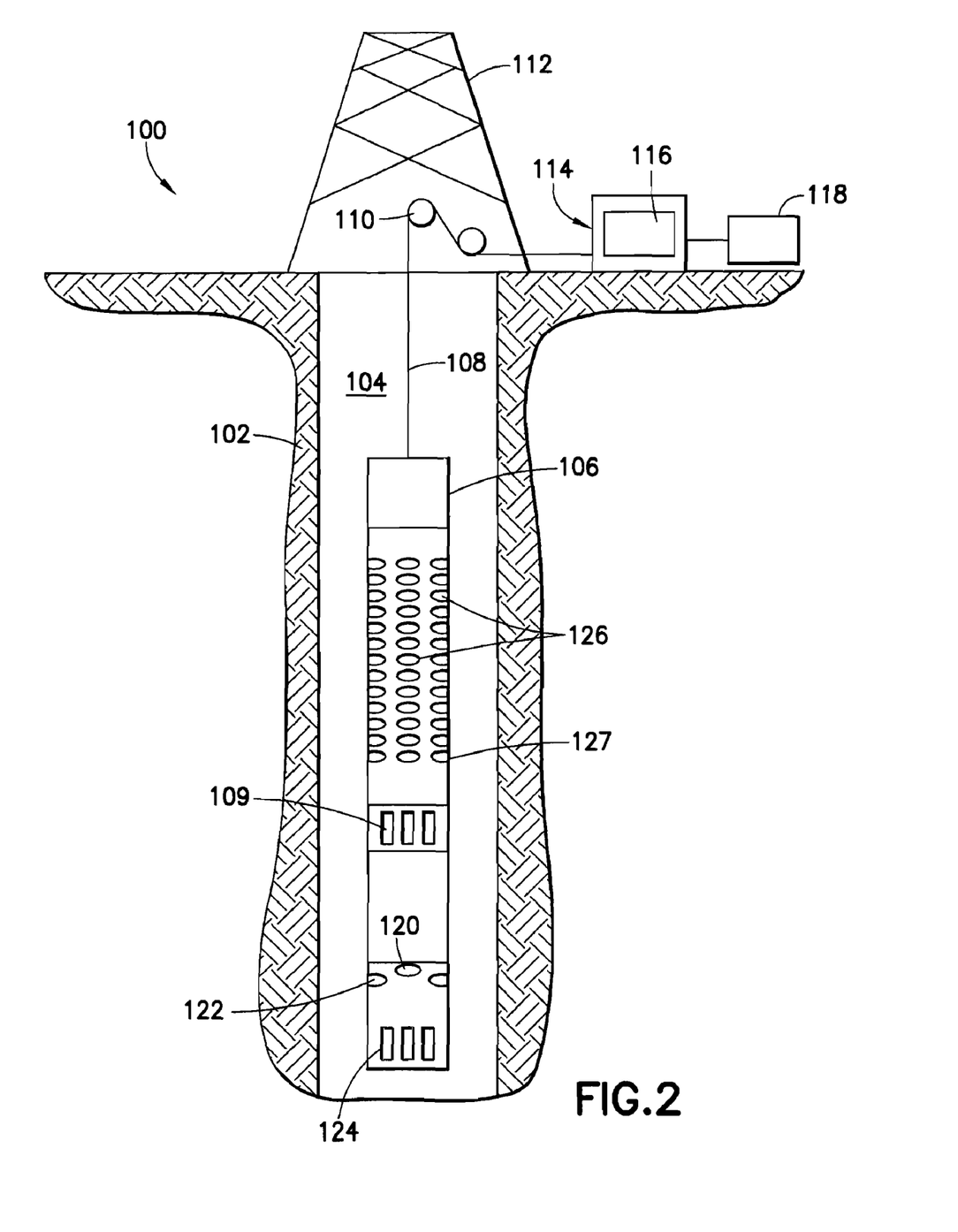
FIG. 2 illustrates a wireline logging embodiment, according to embodiments of the invention.

Referring to FIG. 2, a wireline logging embodiment includes a logging tool (106) suspended from an armored cable (108), and may have optional centralizers (not shown). The cable (108) extends from the borehole (104) over a sheave wheel (110) on a derrick (112) to a winch forming part of surface equipment, which may include an analyzer unit (114). Well known depth gauging equipment (not shown) may be provided to measure cable displacement over the sheave wheel (110). The tool (106) may include any of many well known devices to produce a signal indicating tool orientation. Processing and interface circuitry within the tool (106) amplifies, samples and digitizes the tool's information signals for transmission and communicates them to the analyzer unit (114) via the cable (108). Electrical power and control signals for coordinating operation of the tool (106) may be generated by the analyzer unit (114) or some other device, and communicated via the cable (108) to circuitry provided within the tool (106). The surface equipment includes a processor subsystem (116) (which may include a microprocessor, memory, clock and timing, and input/output functions—not separately shown), standard peripheral equipment (not separately shown), and a recorder (118). The logging tool (106) is representative of any logging device that may be used in accordance with principles described herein. It will be understood by those of skill in the art having the benefit of this disclosure that other suitable logging device, including LWD devices, can also be utilized.

Referring now to both FIGS. 1 and 2, the logging tool, regardless of type, includes at least one acoustic transmitter (109) and at least one acoustic receiver (126). The transmitter is able to excite monopole and dipole acoustic modes. The illustrated logging tool may also include multi-pole transmitters such as crossed dipole transmitters and monopole transmitters capable of exciting compressional, shear, Stoneley, and flexural waves. In the illustrated example a plurality of receivers are arranged on the logging tool at different spacing from the transmitters. The use of a plurality of receivers and transmitters results in improved signal quality and adequate extraction of the various borehole signals over a wide frequency band. The distances and numbers of receivers and transmitters shown in this example are not intended to be limiting.

Figure 3:
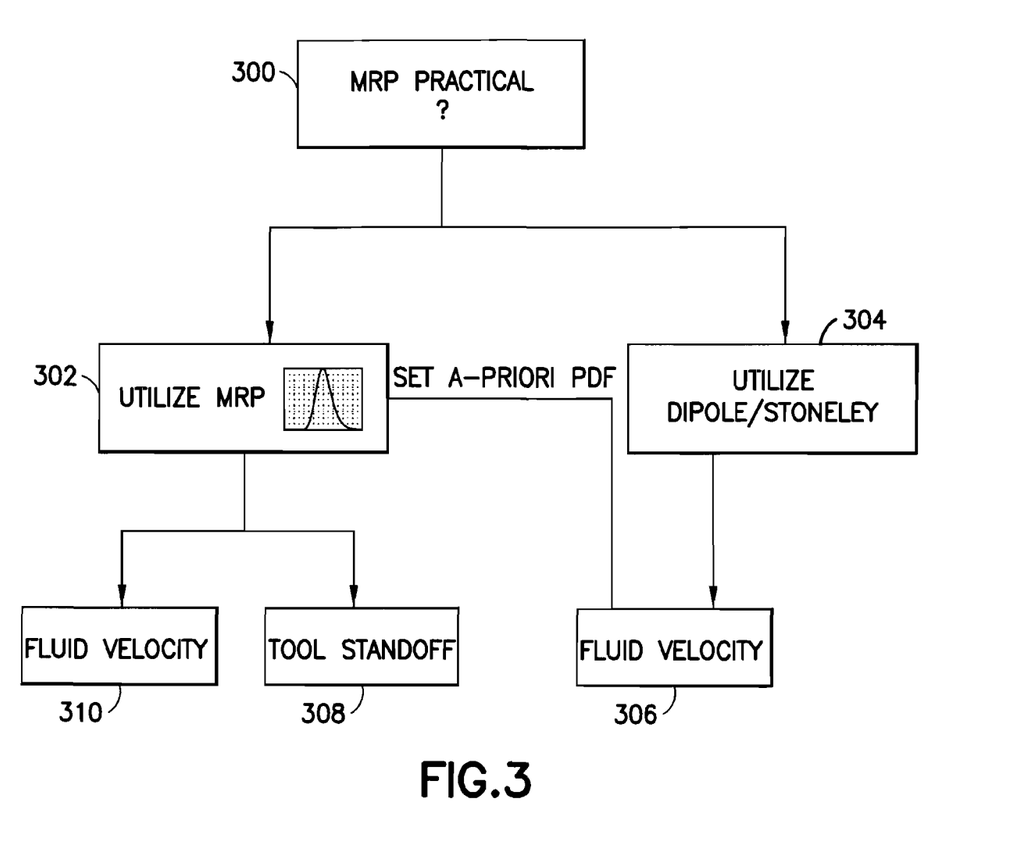
FIG. 3 illustrates automated estimation of fluid slowness and tool standoff.

FIG. 3 illustrates a method by which the logging tool may be utilized to help automate estimation of fluid slowness and tool standoff from the borehole wall. In an initial step (300), a determination is made as to whether Monopole Radial Profiling (MRP) is a practical technique to apply. The outcome of step (300) is a radial velocity profile around the borehole, including primarily formation slowness. If conditions are conducive to use of MRP, e.g., in the case of fast and intermediate formations, then MRP is utilized as shown in step (302) to estimate both tool standoff and fluid velocity as shown in steps (308, 310)). If conditions are not conducive to use of MRP, e.g., in the case of slow formations, then dipole/Stoneley dispersion curves are used to estimate fluid slowness as shown in step (304). In particular, the dipole/Stoneley dispersion curves may be utilized to estimate fluid velocity based on Scholte slowness as shown in step (306). However, even in the case of a fast/intermediate formation, MRP is utilized to estimate tool standoff as shown in step (308). Further, even in the case of a fast/intermediate formation, Scholte slowness from the dipole/Stoneley dispersion curves may be used to set an a priori distribution function. Characteristics of slow, intermediate and fast formations are provided in U.S. Pat. No. 6,654,688, entitled PROCESSING SONIC WAVEFORM MEASUREMENTS, which is incorporated by reference.

Figure 4:
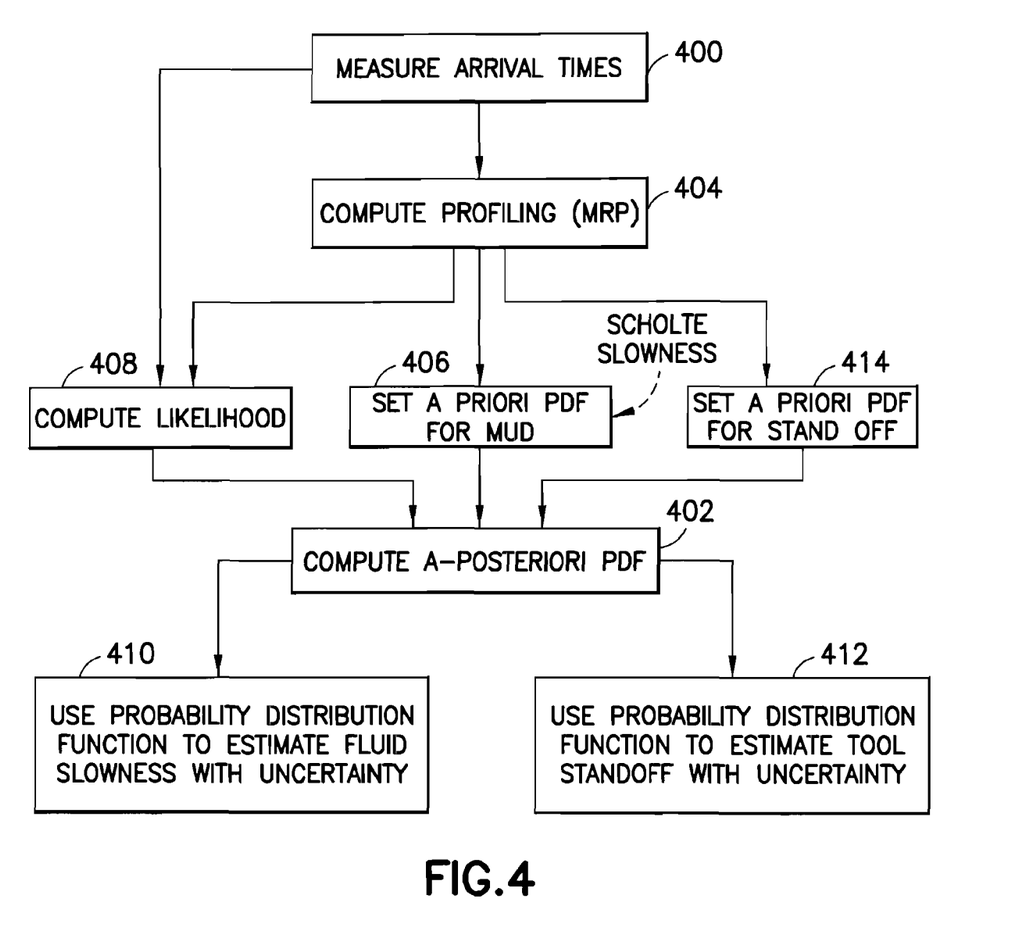
FIG. 4 illustrates the MRP technique in greater detail, according to embodiments of the invention.

FIG. 4 illustrates the MRP technique in greater detail. The first arrival times measured for the different transmitter-receiver spacings as shown in step (400) are used to estimate the posterior probability density function (PDF) (402) associated with the mud velocity $v_f$ and standoff s under the assumption that the borehole and tool related parameters are known. The posteriori PDF is used to estimate fluid slowness with uncertainty and tool standoff with uncertainty as shown in steps (410, 412). In addition to the unknown mud velocity and standoff, the uncertain parameters are the thickness $H_j$ and the velocity $V_j$ of the layers surrounding the borehole. For a given layer indexed j, the layer thicknesses and velocities $(H_j, V_j)$ and their probability distributions are estimated (404) from the differential transit times as described by Valero, H. P., Zeroug, S., Bose, S., A ray-based sonic DTC radial profiling algorithm, SDR Research Note, OFSR/RN/2005/090/MM/C, 2005, and published patent application US-2006-0233047-A1, both of which are incorporated by reference. The uncertainty associated with $H_j$ and $V_j$ is assumed described by a random variable that is Gaussianly distributed with mean and standard deviation $\sigma_{H_j}$, $\sigma_{V_j}$ respectively. Letting m represent the unknowns of the problem, i.e., m=($v_f$,s) where $v_f$ is the fluid velocity and s the standoff, $d_{obs}$ represents the first break of the compressional head wave measured for different TR spacings and the pair (H,V) describing the known but uncertain layer thicknesses and velocities. The joint a posteriori probability distribution of any model m to fit the observed first arrival times $d_{obs}$ and a state of prior information I can be expressed as:

$$P(m \mid d, I) = \frac{P(m \mid I) P(d \mid m, I)}{P(d \mid I)} \quad (1)$$

or when neglecting P(d|I), the prior probability density function of the data $$P(m|d,I) \propto P(m|I) P(d|m,I). \quad (2)$$

In equations 1 and 2, P(m|I) the a-priori information describing the knowledge of the model irrespective of the data and P(d|m,I) is a likelihood function (408). The data vector d represents the various predicted transit time for the given model m, i.e., $$d = \{t_1, t_2, \ldots, t_m\} \quad (3)$$

Note that the expression of the transit time given an altered formation is given by $$TOF_i = \frac{2s}{v_f}\left[1 - \frac{v_f^2}{V_i^2}\right]^{1/2} + 2\sum_{j=1}^{i-1} \frac{H_j}{V_j}\left[1 - \frac{V_j^2}{V_i^2}\right]^{1/2} + \frac{X}{V_i}; \quad (4)$$

$$i = 1, \ldots K; \quad K \leq K_{max}$$

Among these time of flight the shortest is assigned to $X_i$ that is TOF=min[TOF,i=1,$K_i$].

The a-priori probability distribution function (406) is indicative of knowledge related to mud slowness. The probability is associated with a range, e.g., mud slowness within the range [170 μs/ft 300 μs/ft] in the case of water based mud, although a different range could be utilized. It is known that the probability of occurrence of particular values of mud velocity is not uniform in this interval and that, for most of the cases, the probable mud slowness for a water based mud is around 200 μs/ft. Similar distribution functions are applicable to oil based and brine mud slowness. Therefore, the choice for the a priori probability function for the mud slowness distribution (406) is the lognormal distribution function, however other distributions could be applied too without changing the computational workflow of the invention. As described by Rade, L., and Westergre, B., 2004, Mathematics handbook for science and engineering, 5th ed, Springer, 562 pp, the lognormal distribution function can be defined as:

$$f(x) = \frac{1}{(x-\theta)\sigma\sqrt{2\pi}} \exp\left[-\frac{\ln\left[\frac{x-\theta}{m}\right]}{2\sigma}\right] \quad (5)$$

with $x \geq \theta; m \geq 0; \sigma > 0$.

where $\sigma, \theta$, and m are respectively the shape, location and scale parameters. When $\theta=0$ and $m=1$ it corresponds to the standard lognormal distribution while when $\theta=0$ it is called the 2-parameter lognormal distribution. The expression for the standard lognormal distribution is therefore:

$$f(x) = \frac{1}{x\sigma\sqrt{2\pi}} \exp\left[-\frac{\ln[x]}{2\sigma}\right]^2 \quad (6)$$

with $x \geq 0; \sigma > 0$.

Figure 5:
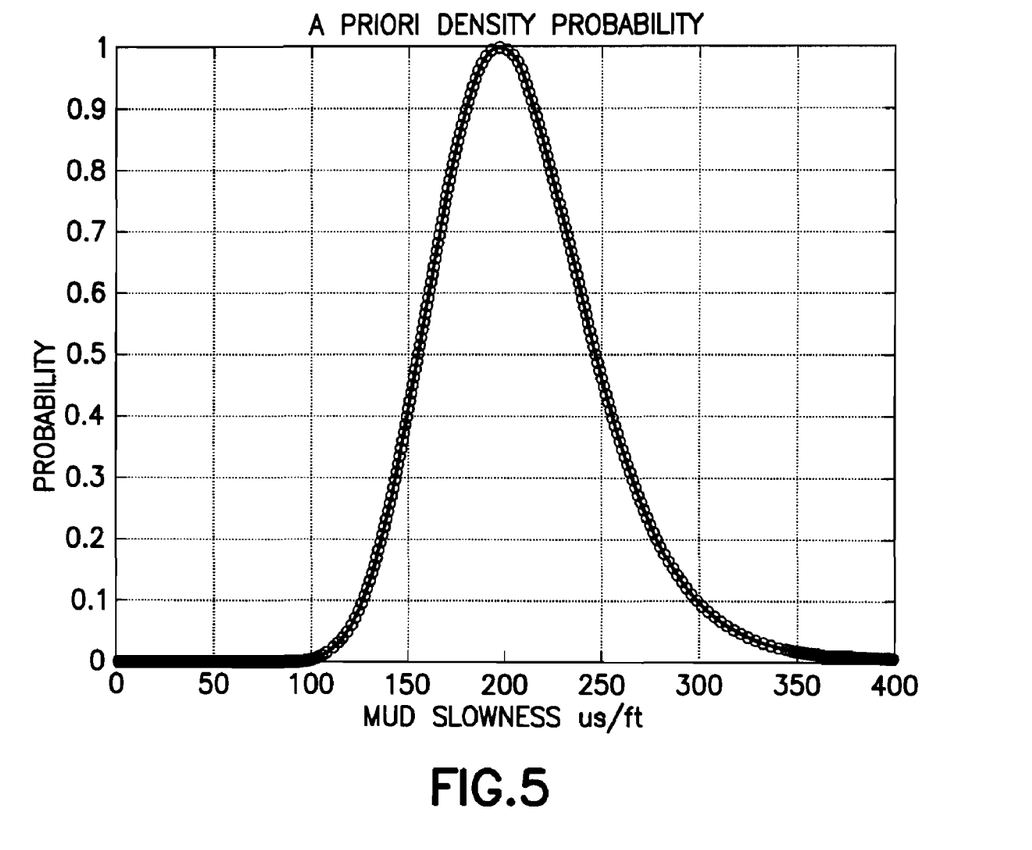
FIG. 5 illustrates an example of lognormal distribution for water based mud, according to embodiments of the invention.

FIG. 5 illustrates a lognormal distribution for water based mud. In practice, the "center" of the distribution is set based on some empirical calculation or on some a-priori knowledge from other wells or other indirect measurements. The center distribution can also be set using Scholte slowness. The standard deviation controls the uncertainty and therefore is defined depending on the trust in this a-priori information. Table 1 lists parameters associated with water, oil and brine mud. Note however these parameters are merely presented as examples, and are not intended to be limiting in any way.

| Mud Type | Range μs/ft | Bean μs/ft | Standard Deviation μs/ft |
|---|---|---|---|
| Water | 170-300 | 200 | 20 |
| Oil | 220-270 | 250 | 20 |
| Brine | 160-190 | 175 | 20 |

An a priori probability distribution function may also be defined for standoff s as shown in step (414, FIG. 4). According to one caliper-based technique for measuring standoff, acceptable accuracy of the measurement can be on the order of +/−0.5" for a borehole of diameter of less than 19". Assuming a 90% chance that the accuracy is inferior or equal to 0.5", which is equivalent to having 0.5"=1.64σ, the uncertainty of the standoff is $$\frac{0.5}{1.64} \text{ or } 0.3049''.$$

The likelihood function (408) measures how well the data predicted by a given model m fits the observed measurements. Equation 4 relating the data and model parameters is a non linear relation that can be written in a matrix form as:

$$d = G(m) \quad (7)$$

Note that the relations are non linear but can be linearized locally. Under the assumption of Gaussian data uncertainty distribution, the likelihood function can be expressed as $$P(d \mid m, I) = K \exp\left[-\frac{1}{2}(d - d_{obs})^T C_D^{-1}(d - d_{obs})\right] \quad (8)$$

with $$K = [(2\pi)^L \det\{C_D\}]^{-1/2} \quad (9)$$

where $C_D$ is the covariance matrix describing the uncertainties related to the data. More precisely, $C_D$ combines the uncertainties associated with the observed measurements (here represented by the covariance matrix $C_d$) and the ones ($C_T$) describing the errors related to the theoretical model (i.e., the forward modeling). Since the covariance matrices $C_d$ and $C_T$ describe uncertainty associated with random Gaussianly distributed variables, the total uncertainty covariance matrix $C_D$ is the sum of the individual matrices:

$$C_D = C_d + C_T. \quad (10)$$

When the errors of the theoretical model are assumed small as compared to the ones associated to the measurements, it follows that:

$$C_D \approx C_d. \quad (11)$$

Two exemplary cases will now be described. First, with $C_D$ being proportional to the matrix identity leading to the simplification of equation 8 and 9 as $$P(d \mid m, I) = K \exp\left[-\frac{1}{2}\sum_{i=1}^{L} \frac{|t_i - t_{obs}|^2}{\sigma_i^2}\right]. \quad (12)$$

This equation represents the likelihood function assuming a least square $l_2$ norm of fit. If a Laplacian distribution is considered to describe the uncertainties associated with the data, the likelihood function based on the $l_1$ norm would be:

$$P(d \mid m, I) = H \exp\left[\sum_{i=1}^{L} |t_i - t_{obs}|\right]. \quad (13)$$

Figure 6:
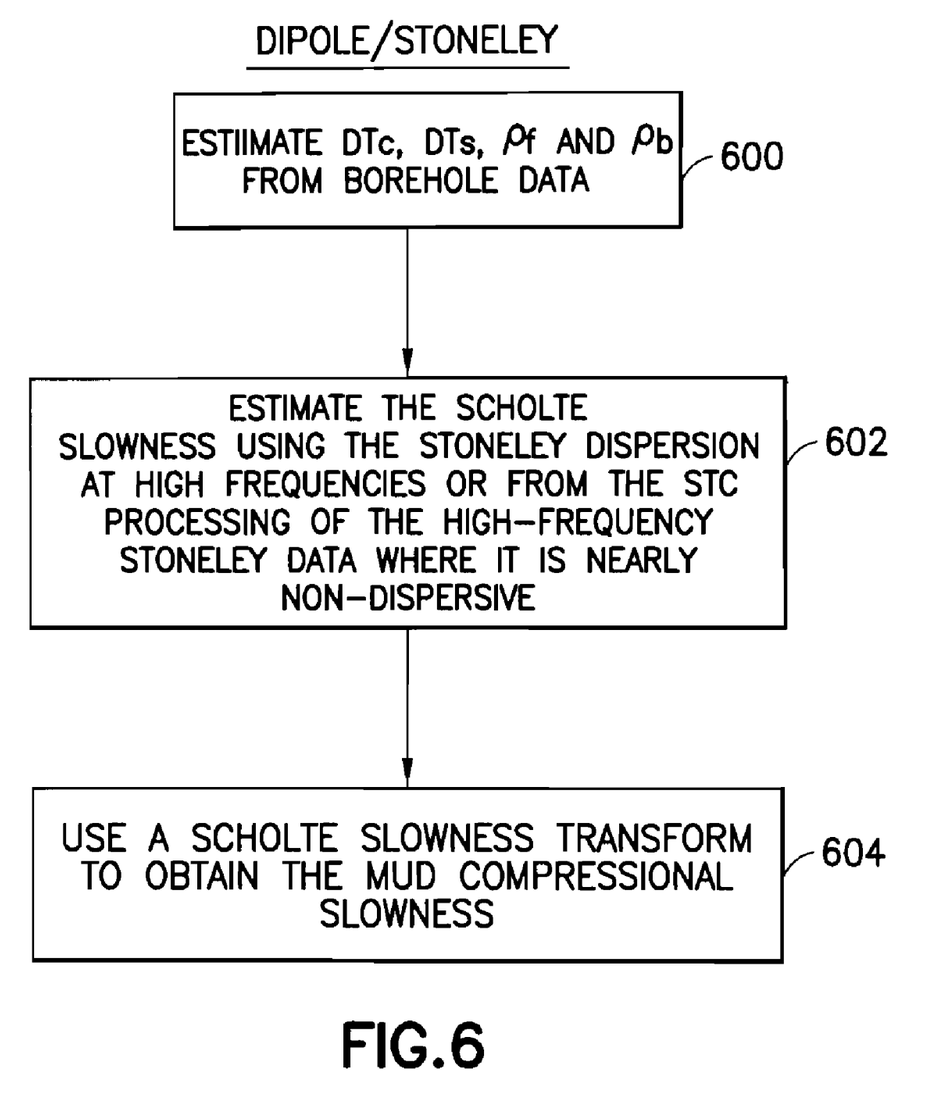
FIG. 6 illustrates mud compressional slowness estimation using Stoneley dispersion at high frequencies or STC processing of the high-frequency Stoneley data where it is nearly non-dispersive, according to embodiments of the invention.

FIG. 6 illustrates mud slowness estimation using Scholte slowness from the Stoneley and dipole dispersion curves in greater detail. Borehole fluid (mud) compressional slowness is used to estimate formation shear modulus $C_{66}$ and fluid mobility using the borehole Stoneley data. The zero frequency intercept of Stoneley dispersion yields the tube wave velocity, whereas the high frequency Stoneley dispersion asymptotes to the Scholte slowness. The Scholte wave is an interfacial non-dispersive wave that decays away from the borehole surface. The Scholte wave slowness depends on mud and formation material properties, but is independent of borehole radius. In contrast, the lowest-order flexural dispersion asymptotes to the formation shear slowness at low frequencies and to the same Scholte slowness at high frequencies, provided the formation is isotropic. Consequently, when the Scholte slownesses from the high frequency asymptotes of the Stoneley and dipole flexural dispersions are different, it is an indicator of structural or stress-induced anisotropy in the data. The tube wave velocity (velocity is inverse of slowness) can be used to estimate the mud compressional velocity.

However, measurement of tube wave velocity can be challenging because of a lack of Stoneley signal energy at very low frequencies.

Both the lowest-order axi-symmetric Stoneley and flexural dispersions asymptote to the Scholte velocity (or slowness) at high frequencies in an effectively isotropic formation. When the Scholte wave velocity is known either from the Stoneley or flexural wave data, we can estimate the mud compressional velocity $v_f$ using the following equation from Norris, A. N. and Sinha, B. K., 1995, The speed of a wave along a fluid-solide interface in the presence of anisotropy and prestress, 1995 J. Acoust. Soc. Am., 98(2), pp. 1147-1154:

$$\frac{1}{v_f^2} = \frac{1}{V_{Sch}^2} - \frac{\frac{\rho_r^2}{V_s^8}}{\left[\frac{4}{V_{Sch}^2}\left(\frac{1}{V_{Sch}^2} - \frac{1}{V_s^2}\right)^{\frac{1}{2}} - \left(\frac{2}{V_{Sch}^2} - \frac{1}{V_s^2}\right)^2 \left(\frac{1}{V_{Sch}^2} - \frac{1}{V_p^2}\right)^{-\frac{1}{2}}\right]^2} \quad (14)$$

where $\rho_r = \frac{\rho_f}{\rho_b}$ and $V_s^2 = \frac{C_{66}}{\rho_b}$.

$\rho_f$ and $\rho_b$ denote the borehole fluid mass density and formation bulk density, respectively; $V_P$ and $V_S$ are the formation compressional and shear velocities, respectively; $C_{66}$ represents the shear modulus in the borehole cross-sectional plane.

The procedure for obtaining the mud compressional slowness includes several steps. First, at a given depth, estimate DTc, DTs, $\rho_f$ and $\rho_b$ from borehole data as shown in step (600). Second, estimate the Scholte slowness using the Stoneley dispersion at high frequencies or from the STC processing of the high-frequency Stoneley data where it is nearly non-dispersive as shown in step (602). Third, use a Scholte slowness transform to obtain the mud compressional slowness as shown in step (604). For example, for a given formation with DTc=120 μs/ft; DTs=233.99 μs/ft; $\rho_b$=2500 kg/m³; mud density $\rho_f$=1450 kg/m³; an estimated Scholte slowness of 300 μs/ft, yields a mud slowness of 250 μs/ft based on a curve representing the relationship between mud compressional slowness and formation shear slowness for a fixed value of formation compressional and Scholte slowness. When both the mud compressional slowness and the Scholte slowness are known, it is possible to estimate the formation shear slowness.

In the case of an anisotropic formation, e.g., TIV, shear moduli $C_{66}$, $C_{44}$ and $C_{55}$ are used to estimate the mud slowness from Scholte wave slowness. Mud slowness may be computed using equation but inputting into this equation the shear velocity value computed respectively from $C_{66}$ and $C_{44}$ as if for an isotropic formation. The result is two values for the mud slowness called respectively $mud_{C_{66}}$ and $mud_{C_{44}}$. These computed values become the initial guess for estimating the mud slowness in an anisotropic formation. The true mud, i.e., $mud_{aniso}$, will then be defined in the interval bounded by the two mud values computed previously and can be defined as, for example, the middle of this interval. Note that one can also use a linear combination of both computed mud, i.e. $C_{66}$ and $C_{44}$ to get the final estimate of the mud in anisotropic formation. The a priori will therefore be set using $mud_{aniso}$ and the width of the distribution can be defined as half of the interval defined by $mud_{C_{66}}$ and $mud_{C_{44}}$. Note finally that the calculation done with $C_{44}$ could also be done with $C_{55}$. Alternatively, because the Scholte wave slownesses for shear moduli $C_{66}$, $C_{44}$ and $C_{55}$ do not converge for an anisotropic formation, calculation may be based on fastest Scholte wave slowness, which will be closest to $DT_{mud}$.

Figure 7:
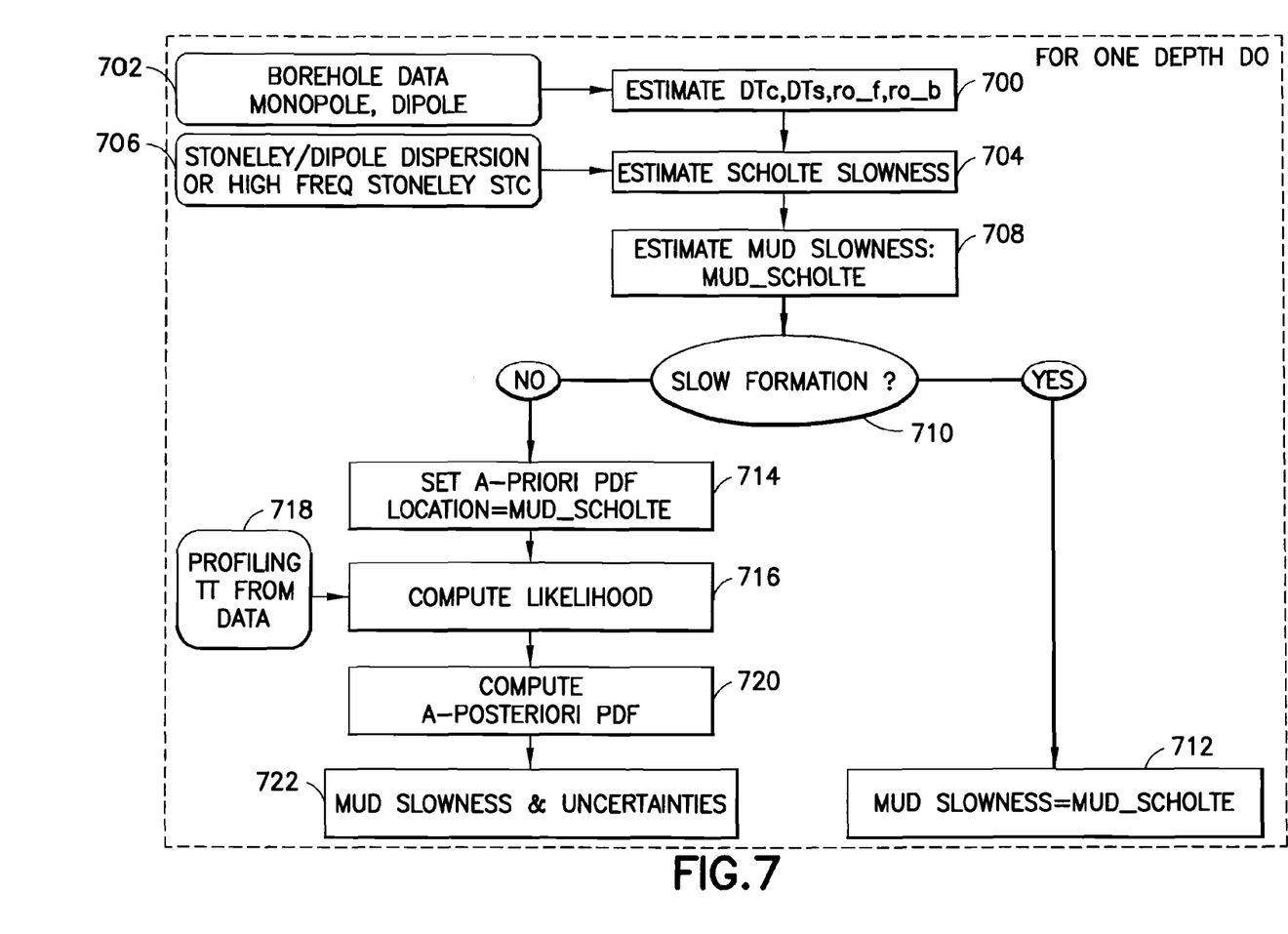
FIG. 7 illustrates an embodiment of the overall integrated technique in greater detail, according to embodiments of the invention.

FIG. 7 illustrates an embodiment of the overall integrated technique in greater details. The following explanation is for estimation at one depth, but can be utilized for an interval by applying the procedure at different depths. The first step (700) is to estimate DTc, DTs, $\rho_f$ and $\rho_b$ from sonic data (702). The second step (704) is to estimate the Scholte slowness using the Stoneley dispersion at high frequencies or from the standard STC processing of the high-frequency Stoneley data where it is nearly non-dispersive, as shown in (706). The computed Scholte slowness is then used to get an estimate of the mud slowness (708). At this stage it is possible to calculate (710) the type of formation, i.e., fast/intermediate or slow. In the case of a slow formation, i.e., where a leaky compressional can provide an estimate of the compressional slowness when present in the data, then the final mud slowness estimated (712) will be the one computed from the Scholte slowness procedure described above. In the case of a fast formation, the a priori probability function is set using the mud slowness estimate computed from the Scholte wave as shown in step (714). This has the advantage of reducing the need for external input from expert personnel. After setting the parameters of the a-priori probability distribution function, the likelihood is computed (716) as explained previously. Profiling and transit time are obtained from the monopole data (718). The a-posteriori probability is then computed (720) from the likelihood and the a-priori probability distribution function. The mud slowness is then estimated (722) from the a-posteriori probability distribution with related uncertainties. Note that the integrated framework is capable of automating some or all of mud slowness estimation for both fast and slow formations.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of estimating an indication of fluid slowness comprising:
   providing processing circuitry for calculating an indication of fluid slowness of a fluid within a formation based on monopole radial profiling;
   providing processing circuitry for calculating an indication of said fluid slowness based on Scholte wave slowness;
   calculating an indication of said fluid slowness based on monopole radial profiling if conditions permit; and
   calculating an indication of said fluid slowness based on Scholte wave slowness if conditions do not permit calculation based on monopole radial profiling.

2. The method of claim 1 including the further step of determining whether conditions permit calculation based on monopole radial profiling output.

3. The method of claim 2 including the further step of determining that conditions permit calculation based on monopole radial profiling if formation slowness is fast or intermediate.

4. The method of claim 1 including the further step of calculating an indication of tool standoff relative to borehole wall based on monopole radial profiling output.

5. The method of claim 1 including the further step of utilizing the Scholte slowness to determine an a priori distribution function to be used to estimate mud slowness.

6. The method of claim 1 including the further step of calculating a value corresponding to fluid slowness based on Scholte wave slowness from Stoneley and dipole modes.

7. The method of claim 1 including the further step of preparing for the calculating steps by estimating compressional slowness, shear slowness, borehole fluid mass density and formation bulk density from borehole data.

8. The method of claim 1 including the further step of calculating a value corresponding to fluid slowness based on fastest Scholte wave slowness if the formation is anisotropic.

9. The method of claim 1 including the further step of outputting fluid slowness and relative uncertainty if calculating the indication of fluid slowness based on monopole radial profiling.

10. The method of claim 1 including the further step of inverting travel time if calculating the indication of fluid slowness based on monopole radial profiling.

11. Apparatus for estimating an indication of fluid slowness comprising:
   at least one acoustic sensor for obtaining monopole radial profiling data and Scholte wave slowness data of a fluid within a formation;
   processing circuitry for calculating an indication of said fluid slowness based on monopole radial profiling if conditions permit; and
   processing circuitry for calculating an indication of said fluid slowness based on Scholte wave slowness if conditions do not permit calculation based on monopole radial profiling.

12. The apparatus of claim 11 including processing circuitry that determines whether conditions permit calculation based on monopole radial profiling.

13. The apparatus of claim 12 including processing circuitry that determines that conditions permit calculation based on monopole radial profiling if formation slowness is fast or intermediate.

14. The apparatus of claim 11 including processing circuitry that calculates an indication of tool standoff on monopole radial profiling output.

15. The apparatus of claim 11 including processing circuitry that utilizes the Scholte slowness to determine an a priori probability distribution function.

16. The apparatus of claim 11 including processing circuitry that calculates an indication of fluid slowness based on Scholte wave slowness from Stoneley and dipole modes.

17. The apparatus of claim 11 including processing circuitry that prepares for the calculations by estimating compressional slowness, shear slowness, borehole fluid mass density and formation bulk density from borehole data.

18. The apparatus of claim 11 including processing circuitry that calculates an indication of fluid slowness based on fastest Scholte wave slowness if the formation is anisotropic.

19. The apparatus of claim 11 including processing circuitry that provides fluid slowness uncertainty if calculating the indication of fluid slowness based on monopole radial profiling.

20. The apparatus of claim 11 including processing circuitry that inverts travel time if calculating the indication of fluid slowness based on monopole radial profiling.

* * * * *